Nov. 21, 1939.  O. C. RITZ-WOLLER  2,180,610
COMBINATION TRUCK MIRROR AND CLEARANCE LAMP DEVICE
Filed April 28, 1937
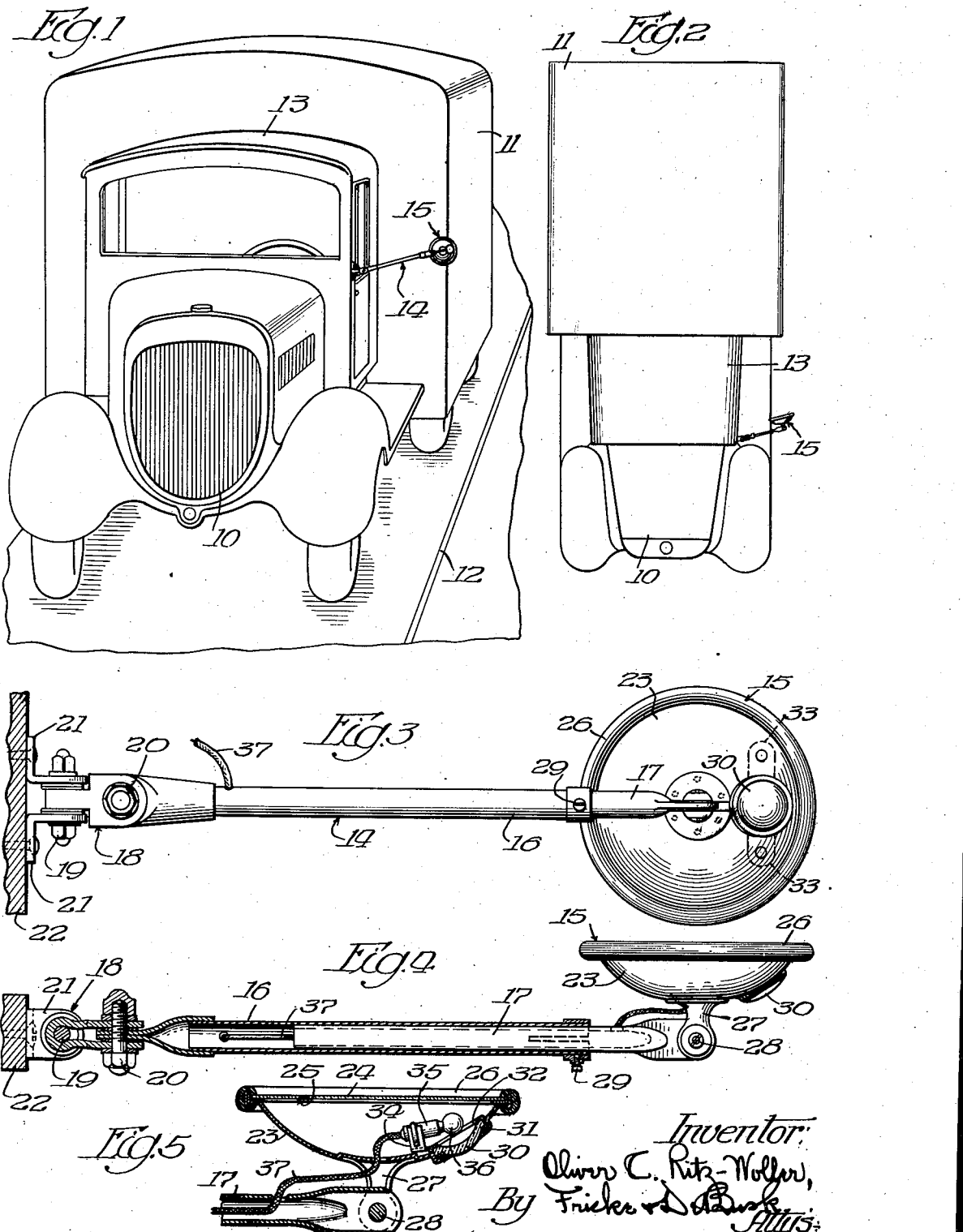

Patented Nov. 21, 1939

2,180,610

UNITED STATES PATENT OFFICE 2,180,610

COMBINATION TRUCK MIRROR AND CLEARANCE LAMP DEVICE

Oliver C. Ritz-Woller, Chicago, Ill.

Application April 28, 1937, Serial No. 139,385

4 Claims. (Cl. 240—4.2)

My invention relates to combination truck mirror and clearance lamp devices for use particularly on trucks of the tractor semi-trailer type and it has for its object the provision of a new and improved form and arrangement of parts in a device of this character whereby the device may be protected effectively against damage even though it is located in widely extended position transversely with respect to the adjacent portions of the trunk. In many of the tractor semi-trailers in use, the cab of the tractor is of very narrow width as compared with the width of the semi-trailer so as to make it necessary to have the arm upon which the mirror is mounted project far beyond the side of the cab with the mirror in position to be particularly subject to damage by contact with other vehicles or with stationary objects. Under these circumstances, it is the principal object of my invention to provide an improved arrangement of the mirror and its mounting means by which a maximum of protection shall be afforded for the mirror and by which the protecting means for the mirror shall serve also as a protecting means for the truck.

To this end, it is my object to provide a novel arrangement of mirror and clearance lamp, in which preferably the clearance lamp is mounted within the mirror casing so as to project a warning signal forwardly through a lens seated in an opening in the outer edge portion of the casing, the arrangement preferably being such that the mirror itself serves as a portion of the casing by which the inner face of the lens is protected against moisture. It is one of the objects of my invention to provide in an improved combination of this type an arrangement by which the mirror is mounted removably in position in its casing, whereby the mirror serves in combination both as a reflector and as a removable closure means.

It is another object of my invention to improve devices of this type in sundry details hereinafter pointed out. The preferred means by which I have accomplished my several objects are illustrated in the drawing and are hereinafter specifically described. That which I believe to be new and desire to cover by Letters Patent is set forth in the claims.

In the drawing,

Fig. 1 is a perspective view of a tractor semi-trailer provided with my improved device;

Fig. 2 is a top plan view of the truck of Fig. 1 but on a slightly smaller scale;

Fig. 3 is a face view of my improved combination mirror and lamp device as seen from the front;

Fig. 4 is a top face view of the device of Fig. 3 but shown partially in section; and Fig. 5 is a horizontal sectional view on a larger scale through a portion of my improved device.

Referring now to the several figures of the drawing, in which corresponding parts are indicated by the same reference characters, 10 indicates the tractor portion and 11 the semi-trailer portion of a tractor semi-trailer of any approved type, being shown in Fig. 1 as occupying substantially the entire width of the roadway at one side of the central line 12 thereof, the cab 13 of the tractor portion of the truck being of considerably smaller width than that of the semi-trailer portion 11. By reason of such relative size of the parts, it is necessary that the arm 14 upon which the mirror device 15 is mounted shall extend outwardly a considerable distance beyond the side of the cab 13 in order to clear the semi-trailer portion 11 so as to enable the driver to get a view through the mirror of a portion of the roadway directly behind the truck.

In the arrangement shown in Figs. 3, 4 and 5, the arm 14 comprises two bars 16 and 17 telescopically mounted with respect to each other so as to provide for a ready adjustment of the effective length of the arm. As shown, the inner end of the arm 14 is mounted in position by means of a universal joint structure 18 comprising bolts 19 and 20 which are adapted to be tightened in position for holding the arm 14 in the desired adjusted angular position. In the arrangement shown the universal joint mechanism 18 is mounted in position by means of brackets 21 secured by means of wood screws in a frame member 22 comprising a portion of the cab 13.

As is best shown in Fig. 5, my improved device comprises a casing member 23 of sheet metal pressed into dished form and provided about its outer edge with a seat for a mirror 24 in transverse position therein, in the structure illustrated a gasket 25 of any approved type being interposed between the mirror and its annular seat in the casing member. In the arrangement shown, the mirror 24 is held in position in the casing member 23 by means of a rubber ring 26 having a groove in its inner face engaging the outer edge portions of the casing member and mirror for holding the mirror releasably in position in the casing member. The arrangement of the ring 26 and its cooperating parts corresponds substantially to the arrangement shown in my application Serial No. 126,957 filed February 23, 1937, now Patent No. 2,111,641 dated Mar. 22, 1938, where the construction is fully described and claimed. The arrangement is such that the ring 26 can be very readily removed for affording access to the interior of the casing 23, while at the same time the parts are held firmly in position under normal conditions. In the arrangement shown, the casing member 23 is provided at about its central point with a short arm 27 which is pivotally connected by a bolt 28 with the outer end of the arm member 17. The arrangement is such that the angular position of the casing member can be changed as desired, by a rotary adjustment of the bar 17 with respect to the bar 16 or by a swinging movement of the casing member 23 about the bolt 28 with respect to the arm member 17. By tightening the bolt 28 and a set screw 29 carried by the arm member 16, the casing member 23 can be secured firmly in adjusted angular position.

At the side of the casing member 23 opposite that at which the arm 14 is mounted, I have provided a suitable opening through the casing member within which a lens 30 is mounted, a gasket 31 being interposed between the lens and the metal for effecting the desired moisture-tight joint between the parts. The lens 30 is held in position in the arrangement shown by means of a sheet metal ring 32 which in turn is secured in position by means of arms 33 projecting from opposite sides thereof as is clearly indicated in Fig. 3. The ring 32 is also provided at its inner side with a bracket 34 in the form of a clip adapted to hold yieldingly in position a socket member 35 within which a light bulb 36 is removably mounted, the socket 35 having an insulated lead wire 37 electrically connected therewith for feeding a suitable current to the light bulb 36 as usual.

By the use of my improved construction, my improved combination mirror and lamp 15 is mounted in the desired spaced relation to the cab 13 so as to be moved to the desired angular relation with respect to the position of the driver. The mirror 24 is mounted in position to afford the desired view rearwardly. The arm 14 upon which the combination mirror and lamp 15 are mounted is adapted to yield freely in case it is brought into contact with another vehicle or with a fixed object so as to reduce to a minimum the probability of damage to the parts by reason of any such contact. The arrangement is such that a driver can very quickly and easily retract the combination device if at any time it is necessary to maneuver the truck in a limited space such as would be likely to endanger the structure. In the event that the combination mirror and lamp is brought into contact with another truck or other object, the rubber ring 26 is adapted to cushion the blow effectively for reducing the probability of damage.

Whenever it is necessary to gain access to the interior of the casing 23 for replacing a light bulb 36 or for cleaning the lens 30, such access may be had by the removal of the rubber ring 26 and of the mirror 24, such parts being very easily and readily replaced after the required readjustments have been made.

While I prefer to employ the form and arrangement of parts as shown in my drawing and as above described, it is to be understood that my invention is not limited to the arrangement as shown except so far as the claims may be so restricted, it being evident that changes might well be made in the form and arrangement of the parts without departing from my invention.

I claim:

1. In a combined truck mirror and warning lamp device, the combination of a casing member of sheet metal pressed into dished form and having an opening therethrough at one side and provided about its outer edge with a seat for a mirror, a lens in said opening, a light bulb within the casing adjacent to said lens, a closure member in the form of a mirror positioned on said seat so as to enclose the light bulb within the casing member, and a ring of yielding material removably mounted about said casing member and said mirror serving to hold the mirror removably in position and to cushion a blow on the edge of the casing member.

2. In a combined truck mirror and warning lamp device, the combination of an arm, means comprising in effect a universal joint for mounting said arm movably in position on a support, a dished casing member pivotally mounted on said arm and having an opening therethrough at the side thereof disposed away from the arm, a lens in said opening, a light bulb within the casing adjacent to said lens, a closure member in the form of a mirror mounted in said casing transversely thereof so as to enclose the light bulb within the casing member, and a ring of yielding material removably mounted about said casing member and said mirror serving to hold the mirror removably in position and to cushion a blow on the edge of the casing member.

3. In a combined truck mirror and warning lamp device, the combination of an arm, means comprising in effect a universal joint for mounting said arm in position on a support so as to be movable angularly in any desired direction with respect to the support, adjustable means adapted when tightened to hold the arm frictionally in any desired adjusted position, a dished casing member pivotally mounted on said arm and having an opening therethrough at the side thereof disposed away from the arm, a lens in said opening, a light bulb within the casing adjacent to said lens, a closure member in the form of a mirror mounted in said casing transversely thereof so as to enclose the light bulb within the casing member, and a ring of yielding material removably mounted about said casing member and said mirror serving to hold the mirror removably in position and to cushion a blow on the edge of the casing member.

4. In a combined truck mirror and warning lamp device, the combination of a dished casing member having an opening therethrough at one side and provided about its outer edge with a seat, a light bulb mounted within said casing adjacent said opening, non-opaque means closing said opening so as to permit the bulb to be seen through the opening, a closure member in the form of a mirror positioned on said seat so as to enclose the light bulb within the casing member, and rubber means removably mounted at the margin of the mirror and cooperating with the margin of the casing member for holding the mirror removably in position on its seat.

OLIVER C. RITZ-WOLLER.